(12) United States Patent
Bachmann

(10) Patent No.: US 10,858,099 B2
(45) Date of Patent: Dec. 8, 2020

(54) RETRACTING HAND LAUNCHING AND LANDING POLE FOR DRONES

(71) Applicant: Helmuth G. Bachmann, Salinas, CA (US)

(72) Inventor: Helmuth G. Bachmann, Salinas, CA (US)

( * ) Notice: Subject to any disclaimer, the term of this patent is extended or adjusted under 35 U.S.C. 154(b) by 298 days.

(21) Appl. No.: 16/035,631

(22) Filed: Jul. 14, 2018

(65) Prior Publication Data

US 2020/0017214 A1 Jan. 16, 2020

(51) Int. Cl.
*B64C 39/02* (2006.01)
*B64F 1/04* (2006.01)
*B64C 25/10* (2006.01)
*B64C 25/52* (2006.01)

(52) U.S. Cl.
CPC .......... *B64C 39/024* (2013.01); *B64C 25/10* (2013.01); *B64C 25/52* (2013.01); *B64F 1/04* (2013.01); *B64C 2201/08* (2013.01); *B64C 2201/187* (2013.01)

(58) Field of Classification Search
CPC ....... B64C 39/024; B64C 25/10; B64C 25/52; B64C 2201/08; B64C 2201/187; B64C 2201/18; B64F 1/04
See application file for complete search history.

(56) References Cited

U.S. PATENT DOCUMENTS

| 4,030,472 | A  | * | 6/1977  | Watkins ................. A63H 27/12 124/5 |
| 9,056,676 | B1 |   | 6/2015  | Wang |
| 9,505,493 | B2 |   | 11/2016 | Borko |
| 2012/0012695 | A1 | * | 1/2012  | Robinson .................. B64F 1/04 244/63 |
| 2016/0304217 | A1 |   | 10/2016 | Fisher |
| 2016/0376031 | A1 | * | 12/2016 | Michalski ............ G08G 5/0026 701/15 |
| 2017/0313442 | A1 | * | 11/2017 | Sirvis ..................... B64C 39/024 |
| 2018/0141682 | A1 |   | 5/2018  | Blake |
| 2018/0155056 | A1 |   | 6/2018  | Balaresque |
| 2019/0337640 | A1 | * | 11/2019 | Dennis .................... B64F 1/225 |

* cited by examiner

*Primary Examiner* — Rodney A Bonnette

(57) ABSTRACT

This invention relates to the use of a retracting hand launching and landing pole for drones having small or short landing legs that are difficult to grasp when hand launching and landing in windy conditions and on moving platforms or irregular ground, and will not interfere with normal flat surface landings.

9 Claims, 3 Drawing Sheets

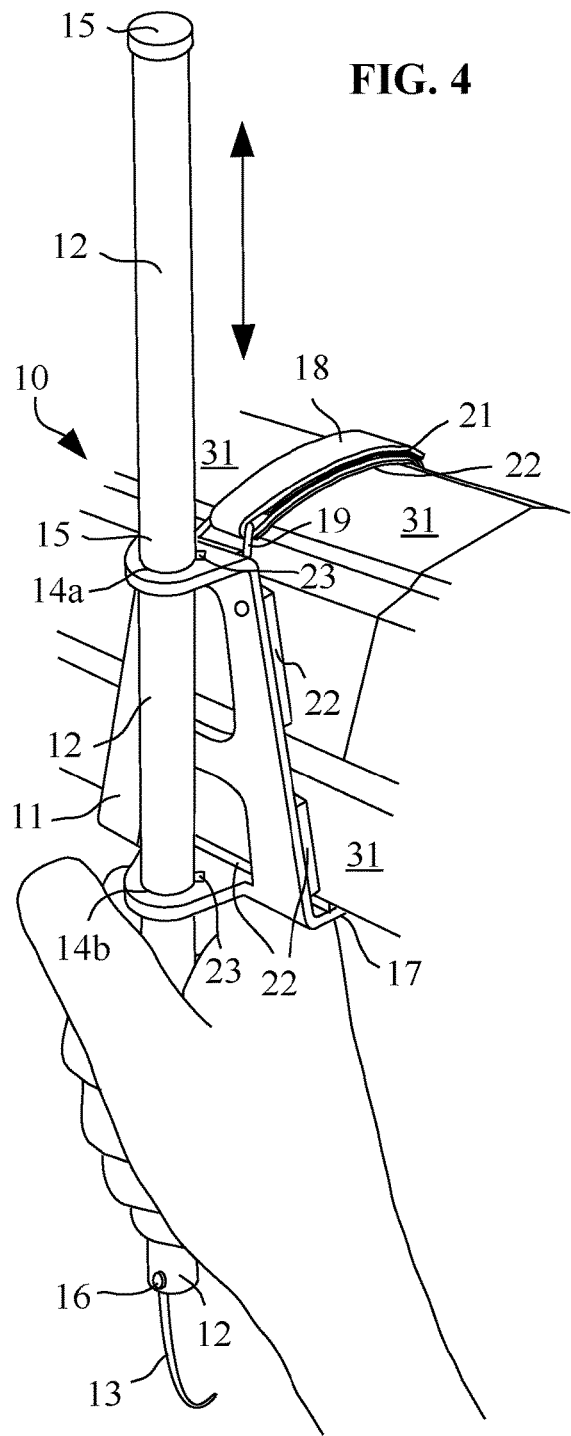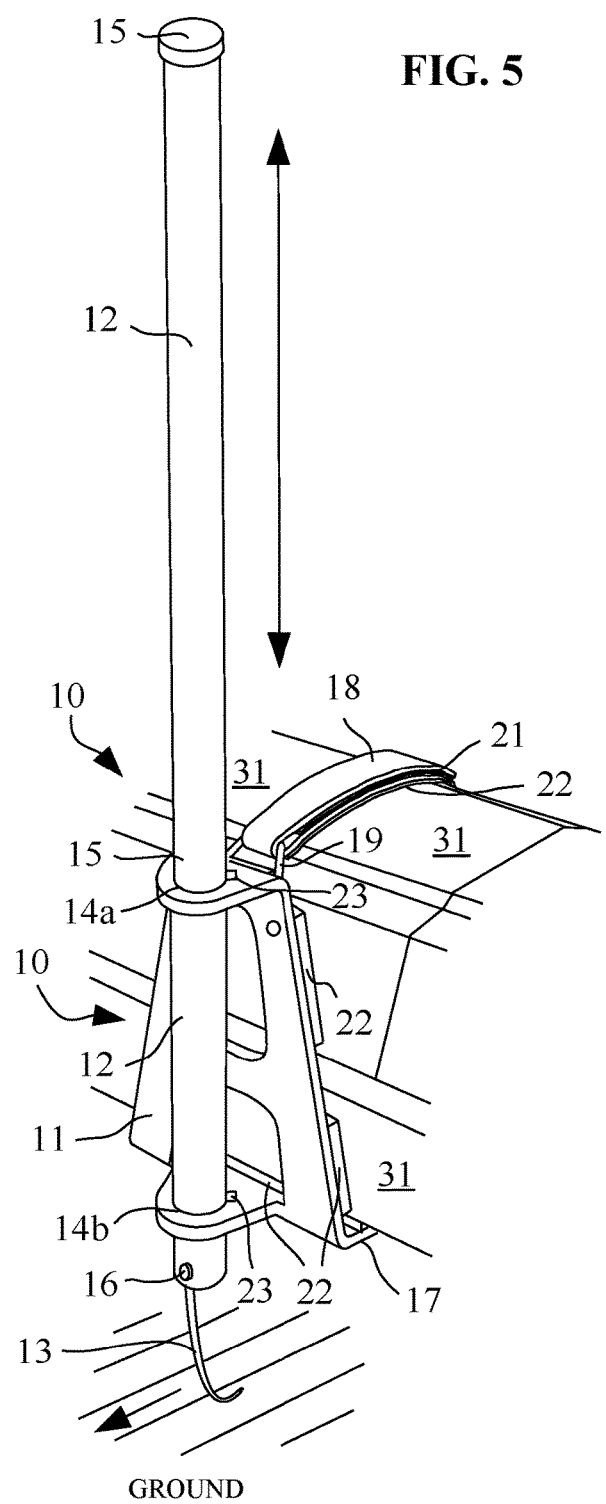

FIG. 6
FIG. 7
FIG. 8
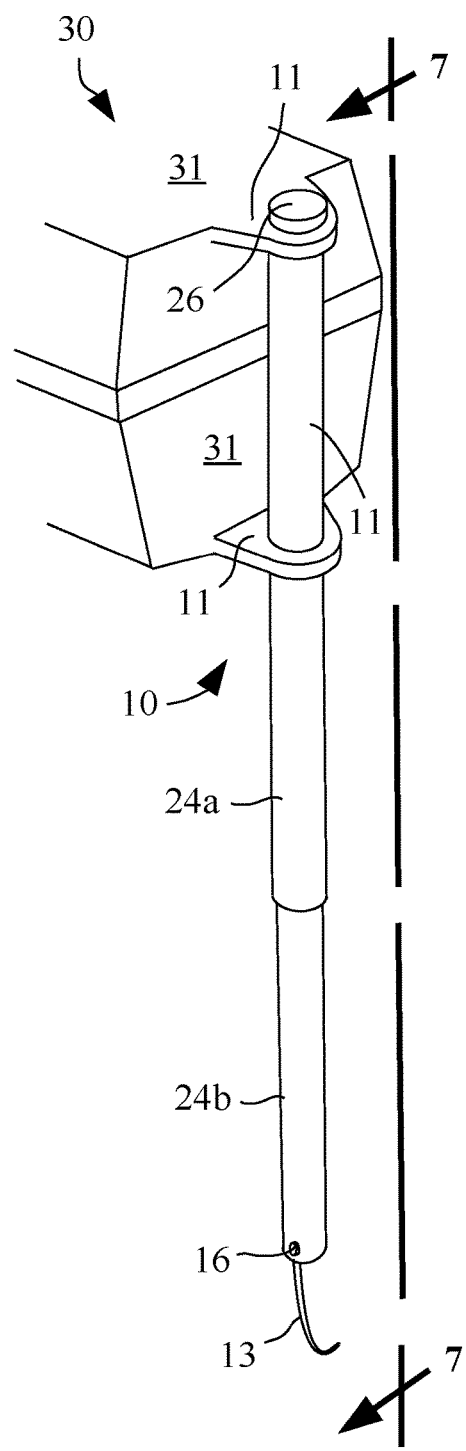
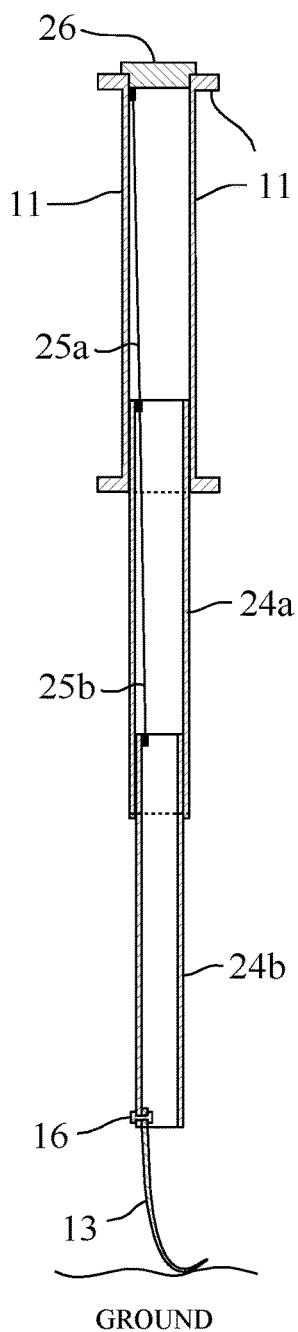
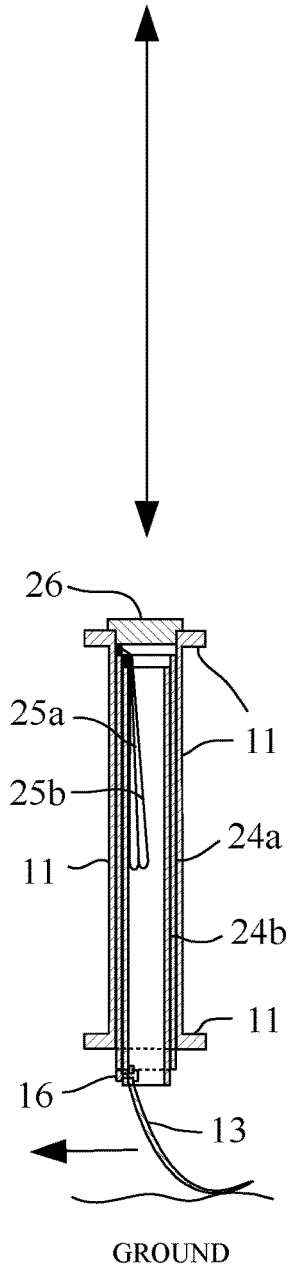

RETRACTING HAND LAUNCHING AND LANDING POLE FOR DRONES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This invention relates to a launching and landing pole that provides safer hand launching and landing in windy conditions and on moving platforms, where flat and stable platforms are not available such as on boats or in mountainous terrain. On large consumer drones the state of the art designs for hand launching and landing utilizes the existing legs for grabbing or catching, and on smaller portable consumer drones with small short legs the body is utilized for grabbing from below which can be difficult and dangerous in windy conditions and or moving platforms. There are attachable landing floats used for water landings from a boat, but they are not recommended in excessively windy or wavy conditions and add a substantial amount of weight and aerodynamic drag as well as instability to the drone. There are numerous patents that employ autonomous landing and docking stations such as in US patent application 20160304217A1 that provide similar although automated functionally for specific applications but are costly and not currently available for consumer drones, as in the description for this invention. Chinese patents CN207045705U, CN204161620U and CN207466962U claim telescoping support tubs or legs which are functionally used for support or damping, and not telescopic self retraction and extension for hand grabbing or surface launching and landing which provides no vertical support for the drone, as in the description of the second embodiment for this invention.

BRIEF SUMMARY OF THE INVENTION

It is the object of this invention to disclose the drawbacks of existing prior art for launching and landing portable consumer drones with small short legs, which requires grabbing the body close to the rotating propellers and to provide a safer alternative.

It is a further object to the present invention to provide a launching and landing pole that retracts and will not interfere with normal surface landings or with the bottom sensors as with conventional hand landings.

It is a further object to the present invention to provide a launching and landing pole that is easily attached and detached and can be used on different drones.

It is a further object to the present invention to provide a launching and landing pole that can be manufactured as an integral part of a drone.

BRIEF DESCRIPTION OF THE SEVERAL VIEWS OF THE DRAWING

FIG. 4 is a side perspective view of a launching and landing pole and a partial view of a drone body and a hand before taking off or after landing;

FIG. 5 is a side perspective view of a launching and landing pole and a partial view of a drone body and ground while taking off or landing;

FIG. 6 is a side perspective view of a launching and landing pole and a partial view of the back end of a drone body;

FIG. 7 is a sectional view taken substantially along line 7-7 in FIG. 6 of a telescoping pole and ground while taking off or landing;

FIG. 8 is a sectional view of a retracted telescoping pole in FIG. 6 and ground while taking off or landing;

Corresponding reference numerals designate corresponding parts throughout several views of the drawings.

DETAILED DESCRIPTION OF THE INVENTION

Figure 1:
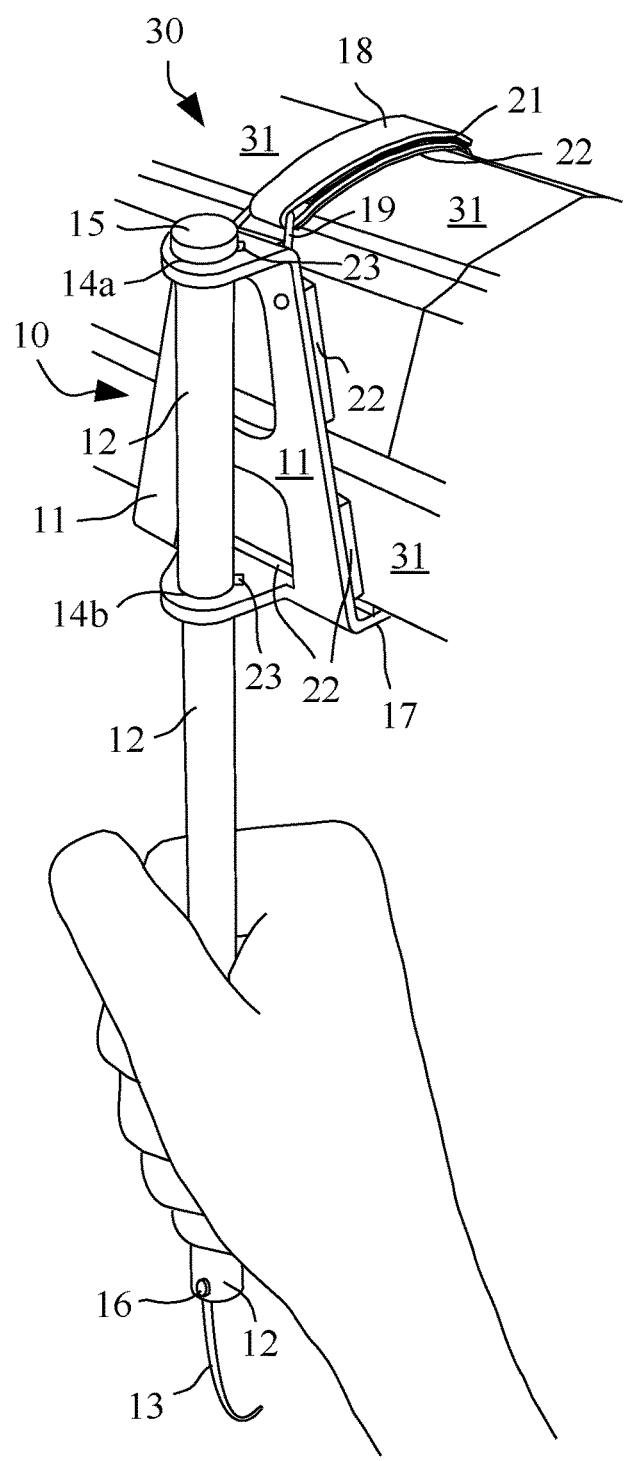
FIG. 1 is a side perspective view of a launching and landing pole embodying the invention and a partial view of a drone body and a hand.
Figure 2:
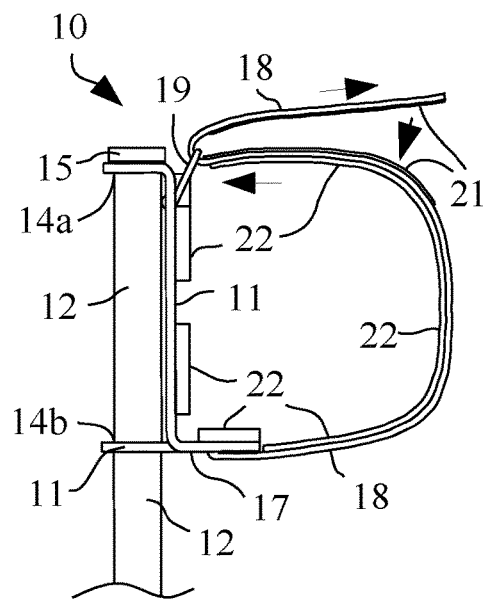
FIG. 2 is a rear view of a launching and landing pole.
Figure 3:
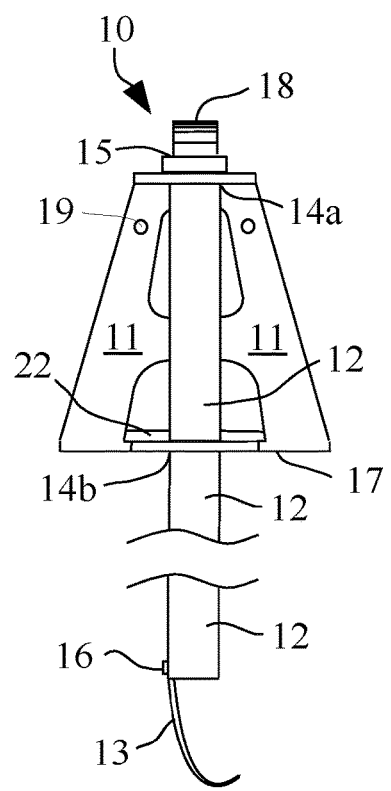
FIG. 3 is a side view of a launching and landing pole.

Referring now to the drawings, and more particularly to FIGS. 1 through 3, a launching and landing pole 10 for hand launching and landing a drone 30 with a body 31, comprised of a pole mount 11 and a pole 12 with a flexible landing skid 13. The pole mount 11 has slide holes 14(a) and 14(b) that support the pole 12 in place and allow it to slide up and down to retract or extend and is stopped by a stop cap 15 at the top and a stop skid fastener 16 at the base that also fastens the flexible landing skid 13. The pole mount 10 has an extended flange 17 at the base with a strap 18 that is permanently attached. To attach the launching and landing pole 10 to a drone 30 the lose end of the strap 18 is quickly looped around the body 31, then through a flexible eye 19 and tightened to fit the girth and secured in place with the hook and loop fasteners 21 on the strap 18, detachment is also quick and necessary in order to change the battery between flights on some drones. When attached, the pole mount 11 is designed to provide torsional support for the pole 12 by having the extended flange 17 and rubber grip pads 22 which are also on the strap 18 to prevent slippage and protect the drone's body 31. The pole mount 11 and strap 18 can be placed to avoid bottom sensors and they will not be triggered by the hand as with a conventional hand landing or grasping of the body 31. Referring now to the drawing FIG. 4, to take off using the launching and landing pole 10, the base of the pole 12 is grasped with one hand and throttle power is applied to the drone 30, as a single operator the auto takeoff feature can be used. The drone 30 will lift and slide up the pole 12 at which point it is released and the pole 12 is in the extended down position as shown in FIG. 1. When landing the drone 30 it is brought into position and the pole 12 is grasped firmly with one hand and the throttle is backed down as it slides down the pole 12 coming to rest and shut down on top of the hand again. The launching and landing pole 10 will not interfere with normal ground surface takeoffs and landings since the pole 12 is preferably made of a light thin walled carbon fiber tube that easily slides up or down upon touching the ground, and the landing skid 13 at the base further prevents the pole 10 from dragging or snagging the ground if the drone 10 drifts sideways as shown in FIG. 5 and FIG. 8. When the drone 30 lands, the landing skid 13 bends and collapses and the stop skid fastener 16 hits the pole mount 11 (not shown). The pole 12 can also be removed from the pole mount 11 for storage by rotating the pole 12 to let the stop skid fastener 16 pass through each release hole 23 in the pole mount 11. Referring now to the drawings FIGS. 6 through 8, the launching and landing pole 10 can be made more compact by having a telescoping pole 12 instead of a sliding pole 12 with slide holes 14(a) and 14(b) as shown in FIG. 1. When the telescoping pole 12 is extended from the pole mount 11 for hand landings the telescopic sections 24(a) and 24(b) are retained by retention lines 25(a) and 25(b) respectively, which holds them in place when telescoped out without affecting their retraction, and the pole mount 11 also has a stop plug 26 which stops and retains the telescopic section 24(a) and 24(b) at the top. The telescoping pole 12 also has a landing skid 13 at the base.

A second embodiment comprising a launching and landing pole 10 with a pole mount 11 that is mounted permanently on the drone body 31 and is located at the back end of the drone 10 as shown in FIG. 6 for a portable drone 10, so as not to interfere with the folding of the arms on the sides. As in the first embodiment the pole 12 can comprise a pole 12 and one or more slide holes 14(a) and 14(b) (not shown) or a telescoping pole 12 which is functionally the same as the first embodiment.

The present invention has been fully described by way of example with the accompanying drawings. Various alternations and changes can be made without departing from the spirit and broader aspects of the invention as set forth in the appending claims, which are to be interpreted in accordance with the principles of patent law including the doctrine of equivalents.

I claim:

1. A launching and landing pole provided for a drone with a body, comprising a pole mount and a pole with a base, wherein said pole mount slides up and down relative to said base of said pole to extend and retract said pole when taking off or landing with the hand or on the ground.

2. The launching and landing pole recited in claim 1 further comprises one or more slide holes that support said pole a stop cap and a stop skid fastener, wherein said pole is stopped at the ends by said stop cap and said stop skid fastener.

3. The launching and landing pole in claim 1 further comprises a strap, wherein said pole mount is strapped onto said body of said drone and can be attached or detached from said body.

4. The launching and landing pole in claim 3 further comprises a flexible eye and hook and loop fasteners on said strap, wherein said strap is past through said flexible eye then tightened and secured in place by said hook and loop fasteners.

5. The launching and landing pole in claim 3 further comprises foam rubber grip pads on said pole mount and said strap to firmly grip said body of said drone.

6. The launching and landing pole recited in claim 1 further wherein said pole is comprised of one or more telescopic sections each with a retention line and a stop plug at the top of said pole mount, and wherein each telescopic section is held in place by said retention line when telescoped out and can also retract into each other and said pole mount when landing and is stopped by said stop plug.

7. The launching and landing pole in claim 1 wherein said pole mount is permanently on said body of said drone.

8. The launching and landing pole in claim 1 further comprises a landing skid mounted on said base of said pole, wherein said pole slides up or down to retract upon said landing skid touching the ground and said landing skid prevents said pole from dragging or snagging the ground when said drone drifts sideways.

9. The launching and landing pole in claim 1 wherein said pole is made of a 12 mm OD and 11 mm ID tube.

* * * * *